US011875808B2

(12) United States Patent
Li et al.

(10) Patent No.: US 11,875,808 B2
(45) Date of Patent: Jan. 16, 2024

(54) VOICE CALL METHOD AND APPARATUS, ELECTRONIC DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Yuepeng Li, Shenzhen (CN); Zhipeng Liu, Shenzhen (CN); Rui Zhu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 252 days.

(21) Appl. No.: 17/460,160

(22) Filed: Aug. 27, 2021

(65) Prior Publication Data
US 2021/0390969 A1 Dec. 16, 2021

Related U.S. Application Data

(63) Continuation of application No. PCT/CN2020/081385, filed on Mar. 26, 2020.

(30) Foreign Application Priority Data

Sep. 24, 2019 (CN) .......................... 201910906728.3

(51) Int. Cl.
G10L 21/02 (2013.01)
G10L 25/51 (2013.01)
H04M 3/00 (2006.01)

(52) U.S. Cl.
CPC .............. G10L 21/02 (2013.01); G10L 25/51 (2013.01); H04M 3/002 (2013.01)

(58) Field of Classification Search
CPC ........ G10L 21/02; G10L 25/51; H04M 3/002; H04M 9/082; H04M 1/72454; H04M 1/6008
See application file for complete search history.

(56) References Cited

U.S. PATENT DOCUMENTS 11,404,073 B1 * 8/2022 Zhang ................ G10L 21/0216
2010/0081487 A1 4/2010 Chen et al.
(Continued)

FOREIGN PATENT DOCUMENTS

CN 101719969 A 6/2010
CN 102437825 A 5/2012
(Continued)

OTHER PUBLICATIONS

Japan Patent Office The Office Action for Application No. JP2021-558866 dated Oct. 20, 2022 8 pages (with translation).
(Continued)

Primary Examiner — Daniel C Washburn
Assistant Examiner — Athar N Pasha
(74) Attorney, Agent, or Firm — ANOVA LAW GROUP PLLC

(57) ABSTRACT

A voice call method is provided. The method includes: obtaining a voice call state of a terminal system at a historical moment, the terminal system being provided with at least two audio acquisition devices; obtaining first voice signals acquired by the at least two audio acquisition devices at a current moment, and determining signal energy of the first voice signals; and determining a target audio acquisition device at the current moment from the at least two audio acquisition devices based on the voice call state at the historical moment and the signal energy of the first voice signals.

13 Claims, 9 Drawing Sheets

(56) References Cited

U.S. PATENT DOCUMENTS

| | | | |
|---|---|---|---|
| 2010/0111324 A1 | 5/2010 | Yeldener et al. | |
| 2011/0124380 A1 | 5/2011 | Wang | |
| 2012/0057717 A1 | 3/2012 | Nystroem | |
| 2012/0078619 A1 | 3/2012 | Sakai et al. | |
| 2012/0163368 A1* | 6/2012 | Battig | H04R 27/00 370/352 |
| 2015/0201278 A1 | 7/2015 | Bao et al. | |
| 2016/0150337 A1 | 5/2016 | Nandy | |
| 2016/0227336 A1* | 8/2016 | Sakri | H04M 9/08 |
| 2017/0064087 A1 | 3/2017 | Mani et al. | |
| 2017/0264734 A1 | 9/2017 | Lee et al. | |
| 2021/0074310 A1* | 3/2021 | Bryan | H04R 3/005 |
| 2021/0407668 A1* | 12/2021 | Fish | H04L 63/101 |
| 2022/0321631 A1* | 10/2022 | Jiang | H04N 7/142 |

FOREIGN PATENT DOCUMENTS

| | | |
|---|---|---|
| CN | 102710839 A | 10/2012 |
| CN | 104092801 A | 10/2014 |
| CN | 105513596 A | 4/2016 |
| CN | 105847497 A | 8/2016 |
| CN | 106101365 A | 11/2016 |
| CN | 106953961 A | 7/2017 |
| CN | 107210824 A | 9/2017 |
| CN | 107547704 A | 1/2018 |
| CN | 108076226 A | 5/2018 |
| CN | 110166615 A | 8/2019 |
| CN | 110602327 A | 12/2019 |
| JP | S6424662 A | 1/1989 |
| JP | H07336790 A | 12/1995 |
| KR | 20170052056 A | 5/2017 |
| TW | 201633804 A | 9/2016 |

OTHER PUBLICATIONS

The State Intellectual Property Office of the People's Republic of China (SIPO) Office Action 1 for for 201910906728.3, dated Jan. 27, 2021 11 Pages (including translation).

The World Intellectual Property Organization (WIPO) International Search Report for PCT/CN2020/081385 dated Jun. 16, 2020 5 Pages (including translation).

The European Patent Office (EPO) The Extended European Search Report for 20868976.0 dated Apr. 4, 2022 7 Pages.

* cited by examiner

(12)  US 11,875,808 B2

VOICE CALL METHOD AND APPARATUS, ELECTRONIC DEVICE, AND COMPUTER-READABLE STORAGE MEDIUM

RELATED APPLICATION(S)

This application is a continuation application of PCT Patent Application No. PCT/CN2020/081385, filed on Mar. 26, 2020, which claims priority to Chinese Patent Application No. 201910906728.3, entitled "VOICE CALL METHOD AND APPARATUS, ELECTRONIC DEVICE, AND COMPUTER-READABLE STORAGE MEDIUM" and filed with the China National Intellectual Property Administration on Sep. 24, 2019, all of which are incorporated herein by reference in entirety.

FIELD OF THE TECHNOLOGY

The present disclosure relates to the field of computer technologies, and specifically, to a voice call method and apparatus, an electronic device, and a computer-readable storage medium.

BACKGROUND

With the quick development of science and technology, people can make voice calls through terminal systems such as a smartphone, a smartwatch, and a tablet computer. To improve call quality, a manufacturer of a terminal system equips a device with dual microphones for voice acquisition. The dual microphones bring two corresponding voice signals, so that corresponding voice enhancement solutions can be designed accordingly.

SUMMARY

In one aspect, the present disclosure provides a voice call method, performed by an electronic device, the method including: obtaining a voice call state of a terminal system at a historical moment, the terminal system being provided with at least two audio acquisition devices; obtaining first voice signals acquired by the at least two audio acquisition devices at a current moment, and determining signal energy of the first voice signals; and determining a target audio acquisition device at the current moment from the at least two audio acquisition devices based on the voice call state at the historical moment and the signal energy of the first voice signals.

In another aspect, the present disclosure provides a voice call apparatus, the apparatus including: a memory storing computer program instructions; and a processor coupled to the memory and configured to execute the computer program instructions and perform: obtaining a voice call state of a terminal system at a historical moment, the terminal system being provided with at least two audio acquisition devices; obtaining first voice signals acquired by the at least two audio acquisition devices at a current moment, and determining signal energy of the first voice signals; and determining a target audio acquisition device at the current moment from the at least two audio acquisition devices based on the voice call state at the historical moment and the signal energy of the first voice signals.

In yet another aspect, the present disclosure provides a non-transitory computer-readable storage medium storing computer program instructions executable by at least one processor to perform: obtaining a voice call state of a terminal system at a historical moment, the terminal system being provided with at least two audio acquisition devices; obtaining first voice signals acquired by the at least two audio acquisition devices at a current moment, and determining signal energy of the first voice signals; and determining a target audio acquisition device at the current moment from the at least two audio acquisition devices based on the voice call state at the historical moment and the signal energy of the first voice signals.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
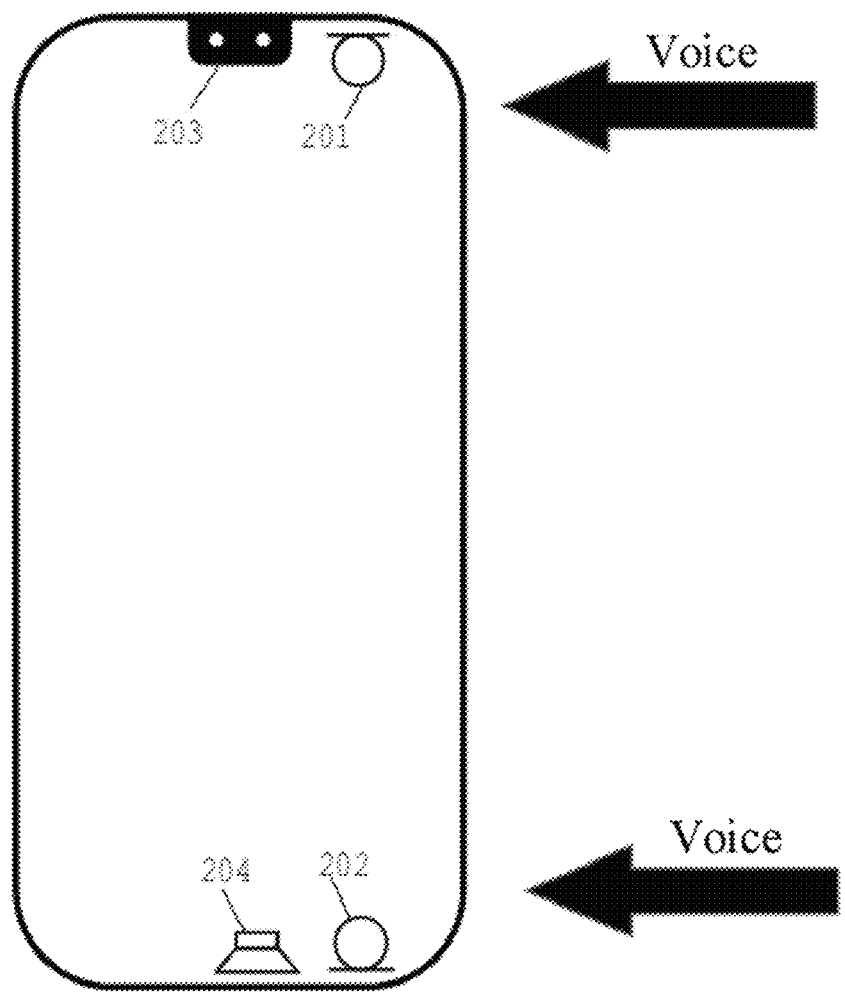
FIG. 1 is a schematic structural diagram of a mobile phone terminal according to one or more embodiments of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In certain embodiments, the term "based on" is employed herein interchangeably with the term "according to."

In certain embodiments, the singular forms "a", "an", "said", and "the" used herein may include the plural forms as well, unless the context clearly indicates otherwise. In certain embodiments, the terms "include" and/or "comprise" used in the present disclosure of the present disclosure refer to the presence of stated features, integers, steps, operations, elements, and/or components, but do not preclude the presence or addition of one or more other features, integers, steps, operations, elements, components, and/or combinations thereof. In certain embodiments, and when an element is "connected" or "coupled" to another element, the element may be directly connected to or coupled to another element, or an intermediate element may exist. In addition, the "connection" or "coupling" used herein may include a wireless connection or a wireless coupling. The term "and/or" used herein includes all of or any of units and all combinations of one or more related listed items.

To make objectives, technical solutions, and advantages of the present disclosure clearer, the following further describes implementations of the present disclosure in detail with reference to the accompanying drawings.

In certain embodiments, a near end is a local end in a communication network during a voice call.

In certain embodiments, a far end is a peer end in a communication network during a voice call.

In certain embodiments, a near-end device is a call device used by a near-end speaker in a voice call. An audio acquisition device (for example, a microphone) and audio playback devices (for example, a loudspeaker and a receiver) are provided on the near-end device.

In certain embodiments, a far-end device is a call device used by a far-end speaker in a voice call. An audio acquisition device (for example, a microphone) and audio playback devices (for example, a loudspeaker and a receiver) are provided on the far-end device.

In certain embodiments, a near-end voice signal is a voice signal acquired by an audio acquisition device of a near-end device when a near-end speaker speaks during a voice call.

In certain embodiments, a far-end voice signal is a voice signal that is transmitted to a near-end device through a communication network during a voice call after speech of a far-end speaker is acquired by an audio acquisition device of a far-end device.

In certain embodiments, an echo signal is a voice signal acquired by an audio acquisition device of a near-end device during a voice call after a far-end voice signal is played by an audio playback device of the near-end device.

In certain embodiments, an echo cancellation is a process of filtering out an echo signal from a voice signal acquired by an audio acquisition device of a near-end device.

In certain embodiments, a far-end single talk is a call state during a voice call when there is a far-end voice signal and there is no near-end voice signal.

In certain embodiments, a near-end single-talk is a call state during a voice call when there is no far-end voice signal and there is a near-end voice signal.

In certain embodiments, a two-end talk is a call state during a voice call when there is a far-end voice signal and there is a near-end voice signal.

In certain embodiments, a no talk is a call state during a voice call when there is no far-end voice signal and there is no near-end voice signal.

In a call system with a dual-microphone terminal system, a microphone signal with a higher signal amplitude is usually used as an input for a subsequent implementation. Although this selection solution can effectively enhance voice when there is only near-end voice, in a scenario in which there is relatively strong far-end voice, if both microphones acquire strong echoes and if the microphone signal with the higher signal amplitude is selected, a microphone signal with a stronger echo is likely to be selected, making it likely impossible to achieve an expected effect of voice enhancement and even reducing voice call quality.

Assuming that two devices making a voice call are A and B, for a user a of the device A, that is, from the perspective of the user a, the device A is a near-end device, and the device B is a corresponding far-end device, that is, a peer-end device. Similarly, for a user b of the device B, the device B is a near-end device, and the device A is a corresponding far-end device.

An example in which the near-end device is the device A is used. When A is the near-end device, a voice signal, acquired by an audio acquisition device of A, of a local speaker, that is, the user a, is a near-end voice signal, and a voice signal (a voice signal generated when a peer-end speaker, that is, the user b speaks) transmitted by B to A is a far-end voice signal. After the far-end voice signal is played by an audio playback device of A, a voice signal acquired by the audio acquisition device of A is an echo signal. A process of eliminating the echo signal in the voice signal acquired by the audio acquisition device of A is echo cancellation. When the user a of the device A and the user b of the device B make a voice call, for the device A, when A receives the far-end voice signal transmitted by B (the user b is speaking) and there is no near-end voice signal (the user a is not speaking) in a voice signal acquired by the audio acquisition device of A, a call state is far-end single talk, and when the user b is not speaking and only the user a is speaking, the call state is near-end single-talk. When the user a and the user b are both speaking, the call state is two-end talk. When neither the user a nor the user b is speaking, the call state is the no talk.

In a call system of a terminal system with two audio acquisition devices, to perform voice enhancement, it may be desirable to select one microphone from the dual microphones as an input microphone. There are generally two selection solutions for the input microphone used in the related art.

In one selection solution, the input microphone is selected according to a signal amplitude of a voice signal acquired by a microphone. A microphone that acquires a voice signal with a higher signal amplitude is selected from the two microphones as the input microphone. That is, the voice signal with the highest signal amplitude is used as an input voice signal for subsequent voice enhancement. However, when or in response to determining there is a strong far-end voice signal in a voice call, the voice signals acquired by the two microphones have strong echoes, so that the microphone selected with the larger signal amplitude may be the microphone with a stronger echo, causing echo leakage and reducing voice call quality.

The other is to select the input microphone according to a call scenario of the terminal system. A dual-microphone terminal system is used as an example. FIG. 1 is a schematic diagram of arrangement of an audio acquisition device and an audio playback device of a common mobile phone. As shown in FIG. 1, the mobile phone is provided with a microphone (referred to as a top microphone) 201 at the top of a screen of the terminal system, a microphone (referred to as a bottom microphone) 202 at the bottom of the screen, a receiver 203 at the top of the screen, and a loudspeaker 204 at the bottom of the screen.

In a hands-free scenario, the loudspeaker 204 at the bottom of the mobile phone plays a far-end voice signal which is acquired by the microphone to form an echo. Because the bottom microphone 202 is closer to the loudspeaker, the acquired echo is relatively strong. A near-end speaker is far away from the mobile phone, and near-end human voice energy acquired by the two microphones is relatively close. In certain embodiments, the signal acquired by the top microphone is a better input choice for subsequent processing.

In a hand-held scenario, the receiver 203 at the top of the mobile phone plays the far-end voice signal, and the near-end speaker holds the mobile phone and speaks near the bottom of the screen. In certain embodiments, the near-end voice signal acquired by the bottom microphone 202 is stronger, and the echo acquired by the top microphone 201 is stronger. In certain embodiments, the signal acquired by the bottom microphone is a better choice for subsequent processing.

Briefly, it is more appropriate to choose the bottom microphone for the hand-held scenario and choose the top microphone for the hands-free scenario. However, an actual call scenario is more complex. In the hands-free scenario, a user may also put the mouth near the bottom microphone 202. In certain embodiments, selecting the top microphone 201 cannot effectively obtain the near-end voice signal. In addition, there are various types of audio playback devices and acquisition devices of different models. In addition to a plurality of placement positions of microphones, there are also stereo playback mobile phones with dual loudspeakers. All of these make it likely impossible to simply associate microphone selection with scenarios. Therefore, an implementation range of a solution for microphone selection according to scenarios is relatively small, and it cannot be ensured that a selected microphone is appropriate.

In view of the above technical problems existing in an existing voice call solution, the embodiments of the present disclosure provide a voice call method. The method provides another more appropriate manner of selecting an audio acquisition device, and can effectively improve a voice call effect.

The following describes the technical solutions of the present disclosure and how to resolve the foregoing technical problems according to the technical solutions of the present disclosure in detail by using specific embodiments. The following several specific embodiments may be combined with each other, and the same or similar concepts or processes may not be described repeatedly in some embodiments. The following describes the embodiments of the present disclosure with reference to the accompanying drawings.

Figure 2:
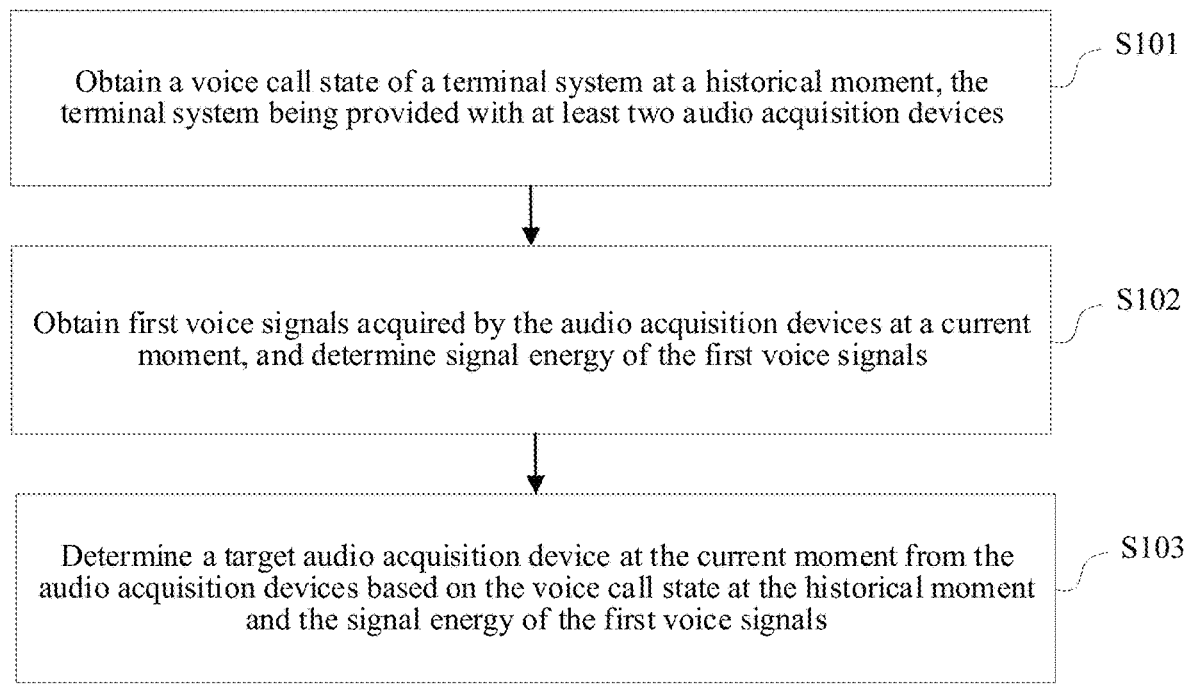
FIG. 2 is a schematic flowchart of a voice call method according to one or more embodiments of the present disclosure.

FIG. 2 is a schematic flowchart of a voice call method according to an embodiment of the present disclosure. The method may be performed by an electronic device such as a terminal system or a server. As shown in FIG. 1, the method may include the following steps:

Step S101: Obtain a voice call state of a terminal system at a historical moment, the terminal system being provided with at least two audio acquisition devices.

The terminal system may be a terminal device integrated with devices such as an audio playback device, an audio acquisition device, and a processor. A specific device type of the terminal device is not limited in this embodiment of the present disclosure, provided that the terminal device is a device that can make a voice call. The terminal device includes, but is not limited to, a mobile phone, a PAD, and the like. The terminal system may be alternatively a voice call system formed by mutually independent audio playback devices, an audio acquisition device, and a processor. For example, the terminal system may be a video conference system. The video conference system includes a plurality of audio acquisition devices (for example, microphones), one or more audio playback devices (for example, a loudspeaker), and a processor. The audio acquisition device and the audio playback device may be distributed according to a conference room or other actual requirements.

In certain embodiments, and when the terminal system is the terminal device integrated with various devices, the method may be performed by the processor integrated in the terminal device, or may be performed by a server corresponding to the terminal device. When the terminal system is the voice call system formed by a plurality of mutually independent devices, the method may be performed by the processor in the terminal system, or may be performed by a server corresponding to the terminal system. In a word, the method may be performed by an electronic device such as a terminal system or a server.

For the terminal system that performs the voice call method, the terminal system is a near-end device of a current voice call, and a peer-end device that performs the voice call with the terminal system is a far-end device.

Each moment in a voice call process may be a time point of re-determining a target audio acquisition device. A historical moment may include one or more moments, and an interval between two moments may be set according to actual requirements. For example, the interval between the two moments may be set to 0.02 seconds. If a current moment is the $0.20^{th}$ second in a voice call, a historical moment is the $0.18^{th}$ second in the voice call.

The voice call state represents a near-end voice condition and a far-end voice condition in a voice call. According to a near-end voice call state at any moment, it can be determined whether there is a near-end voice signal and a far-end voice signal at this moment. For example, a voice call state at the $0.20^{th}$ second in the voice call is far-end single talk. That is, there is a far-end voice signal but no near-end voice signal exists in the $0.20^{th}$ second in the voice call.

The audio acquisition device provided on the terminal system may be a microphone or another type of audio acquisition device. Specific types and specific quantities of the at least two audio acquisition devices and positions of the audio acquisition devices on the terminal system are not limited in this embodiment of the present disclosure. For example, for a mobile phone, the at least two audio acquisition devices may be two microphones, and the two microphones may be respectively disposed at the top and bottom of the front of a screen of the mobile phone, for example, the arrangement manner of dual microphones shown in FIG. 1. The microphones may be alternatively disposed in another manner, for example, may be disposed on the back of the screen, which is not limited in this embodiment of the present disclosure.

Step S102: Obtain first voice signals acquired by the audio acquisition devices at a current moment, and determine signal energy of the first voice signals.

The first voice signal may include a near-end voice signal, an echo signal, an environmental noise signal, and the like. In a voice call, the echo signal and the environmental noise signal may need to be reduced or eliminated, and the near-end voice signal is transmitted to a far-end device. Signal types and signal energy magnitude included in the first voice signals acquired by the audio acquisition devices of a near-end device are different. The signal energy magnitude of each first voice signal may reflect magnitude of the voice signal included in the first voice signal, which may further be used as a basis for subsequent determination of a target audio acquisition device. In an actual implementation, signal energy magnitude of a voice signal may be determined according to a signal amplitude or a size of a peak envelope of the voice signal.

The step numbers in the foregoing step S101 and step S102 do not constitute a limitation on a sequence of the two steps. That is, the sequence of performing step S101 and step S102 may be not in a time order. For example, step S101 may be first performed and then step S102 is performed, or step S102 is first performed and then step S101 is performed, or step S101 and step S102 are simultaneously performed. That is, in an implementation process of this embodiment of the present disclosure, an execution sequence of obtaining a voice call state of a near-end device at a historical moment and obtaining signal energy of first voice signals acquired by the audio acquisition devices at a current moment is not limited.

Step S103: Determine a target audio acquisition device at the current moment from the audio acquisition devices based on the voice call state at the historical moment and the signal energy of the first voice signals.

In certain embodiments, in an actual implementation, within a short time interval of a voice call, a voice call state generally remains unchanged. Therefore, the voice call state at the historical moment may be used to estimate a voice call state at a current moment. That is, the voice call state at the historical moment is considered as the voice call state at the current moment. When the historical moment includes only one moment, a voice call state at this moment is used as the voice call state at the historical moment, and a moment included in the historical moment may be a previous moment adjacent to the current moment. When the historical moment includes a plurality of moments, the voice call state at the historical moment may be determined in the following manner: obtaining voice call states at moments, and determining a voice call state that appears most frequently as the voice call state at the historical moment, or determining a voice call state at a moment closest to the current moment as the voice call state at the historical moment.

Because of different voice call states, types of voice signals acquired by the audio acquisition device are also different. For example, if the voice call state is far-end single talk, the audio acquisition device acquires an echo signal. If the voice call state is near-end single-talk, the audio acquisition device acquires a near-end voice signal (in general, a noise signal further exists). Therefore, the voice call state may represent whether there is the echo signal, whether there is the near-end voice signal, and the like in the first voice signal acquired by the audio acquisition device. That is, types of signals included in the first voice signal may be determined according to the voice call state at the historical moment. For example, if the voice call state at the historical moment is the near-end single-talk, there is a near-end voice signal and no far-end voice signal at the current moment. Because the echo signal is generated due to presence of the far-end voice signal, it can be determined that there is no echo signal in the first voice signal.

After the types of the signals included in the first voice signals are determined according to the voice call state at the historical moment, signal energy magnitude of specific types of voice signals included in the first voice signals may be determined according to the signal energy magnitude of the first voice signals. In other words, the signal energy magnitude of the specific type of voice signals acquired by the audio acquisition devices may be determined. For example, if the voice call state at the historical moment is the near-end single-talk, it is determined according to the voice call state that the first voice signals include near-end voice signals, and generally also include environmental noise signals and the like. However, the environmental noise signals included in the first voice signal have basically similar signal energy magnitude. Therefore, signal energy magnitude of the near-end voice signals in the first voice signals are positively correlated with signal energy magnitude of the first voice signals. That is, when a first voice signal has higher signal energy, a near-end voice signal included in the first voice signal has higher signal energy. That is, a near-end voice signal acquired by a corresponding audio acquisition device has higher signal energy. In certain embodiments, an audio acquisition device that acquires a first voice signal with higher signal energy may be used as the target audio acquisition device.

In summary, a magnitude relationship between signal energy of specific types of voice signals acquired by the audio acquisition devices in a specific voice call state may be determined based on the voice call state at the historical moment and the signal energy of the first voice signals.

Further, a first voice signal acquired by a determined target audio acquisition device at a current moment is a first voice signal that better facilitates subsequent voice enhancement in a corresponding voice state. Generally, a near-end voice signal included in the first voice signal that better facilitates subsequent voice enhancement has higher signal energy, or an echo signal included in the first voice signal has lower signal energy. Because the magnitude relationship between the signal energy of the specific type of voice signals acquired by the audio acquisition devices in the specific voice call state may be determined based on the voice call state at the historical moment and the signal energy of the first voice signals, a target audio acquisition device in a specific voice call state may be determined based on the voice call state at the historical moment and the signal energy of the first voice signals.

Next, when the target audio acquisition device is determined, based on the signal energy of the first voice signals acquired by the audio acquisition devices, the voice call state at the historical moment is also combined, which can effectively avoid a situation when the first voice signal acquired by the determined target audio acquisition device includes the strongest echo signal. In addition, a process of determining the target audio acquisition device does not depend on a call scenario of a near-end device, thereby avoiding a situation when the determined target audio acquisition device fails to acquire an effective near-end voice signal.

In certain embodiments, and in addition to an initial moment, at any moment of a voice call, the target audio acquisition device at this moment may be determined according to the method provided in the embodiments of the present disclosure. For the initial moment of the voice call, at this moment, the target audio acquisition device may be pre-designated or may be any one of at least two audio acquisition devices, or may be selected in an existing manner of determining a target audio acquisition device. For example, the target audio acquisition device at the initial moment is determined based on a call scenario.

When the method is performed by a server, an interaction process between the terminal system and the server in the solution may include: transmitting, by the server, pre-configured information of a target audio acquisition device to the terminal system at an initial moment of a voice call, selecting, by the terminal system, the target audio acquisition device from at least two audio acquisition devices according to the received pre-configured information; or selecting, by the terminal system, the target audio acquisition device from at least two audio acquisition devices according to the received pre-configured information, the pre-configured information being stored in the terminal system. At the current moment, the server receives first voice signals that are transmitted by the terminal system and acquired by the at least two audio acquisition devices, and the server obtains signal energy of the first voice signals and determines the target audio acquisition device at the current moment according to the voice call state at the historical moment and the signal energy of the received first voice signals.

In the voice call method provided in the embodiments of the present disclosure, the voice call state at the historical moment is used, and the signal energy of the voice signals acquired by the audio acquisition devices is combined, to determine an audio acquisition device corresponding to a voice signal that better facilitates subsequent voice enhancement in a specific voice call state as the target audio acquisition device at the current moment. The process of determining the target audio acquisition device does not depend on only the signal energy of the voice signals acquired by the audio acquisition devices or the call scenario of the near-end device, thereby avoiding a problem that an echo is relatively strong or a near-end voice is relatively weak in the voice signal acquired by the target audio acquisition device determined in the related art and improving a voice call effect.

In an embodiment of the present disclosure, the voice call state at the historical moment is determined in the following manner: determining whether there is a far-end voice signal at the historical moment, to obtain a first determination result; determining whether there is a near-end voice signal at the historical moment, to obtain a second determination result; and determining the voice call state at the historical moment according to the first determination result and the second determination result.

The voice call state may indicate a near-end voice condition and a far-end voice condition in a voice call, and a corresponding voice call state may be determined through the near-end voice condition and the far-end voice condition in the voice call.

In certain embodiments, whether there is a far-end voice signal at the historical moment may be determined by determining whether a terminal system receives the far-end voice signal at the historical moment. For example, if an acoustic signal (that is, a far-end voice signal) of a far-end speaker exists in the voice signal received by the terminal system at the historical moment, it is determined that there is the far-end voice signal at the historical moment. Whether there is a near-end voice signal at the historical moment may be determined by determining whether a voice signal acquired by any audio acquisition device of the terminal system at the historical moment includes a near-end voice signal. For example, if the voice signal acquired by any audio acquisition device the historical moment includes an acoustic signal (that is, a near-end voice signal) of a near-end speaker, it is determined that there is the near-end voice signal at the historical moment.

In certain embodiments, whether there is a near-end voice signal or a far-end voice signal in the voice signal may be determined based on features such as signal energy and a signal waveform of the near-end voice signal and the far-end voice signal. For example, a voice signal whose signal energy is within a preset range in a first voice signal may be determined as the near-end voice signal.

In certain embodiments, and when the historical moment includes a plurality of moments, in the present disclosure, the foregoing solution is used to determine a voice call state at each moment. After the voice call states at the moments are determined, the voice call state at the historical moment is further determined. A process of determining the voice call state at the historical moment according to the voice call states at the plurality of moments included in the historical moment may be as described above: a voice call state that appears most frequently in the voice call states corresponding to the moments is determined as the voice call state at the historical moment, or a voice call state at a moment closest to the current moment is determined as the voice call state at the historical moment.

When the method is performed by the server, an interaction process between a corresponding terminal system and the server may include: receiving, by the server, at a historical moment, a far-end voice signal and first voice signals transmitted by the terminal system, obtaining, by the server, a first determination result according to whether the received far-end voice signal is 0, and obtaining, by the server, a second determination result according to whether there is a near-end voice signal in the received first voice signals; and determining a voice call state at the historical moment according to the first determination result and the second determination result.

In an embodiment of the present disclosure, the determining whether there is a near-end voice signal at the historical moment includes: obtaining a second voice signal acquired by the target audio acquisition device at the historical moment; and performing echo cancellation on the second voice signal, to determine whether there is a near-end voice signal in the second voice signal obtained after the echo cancellation.

In certain embodiments, after the target audio acquisition device at the historical moment is determined, echo cancellation and subsequent voice enhancement may need to be performed on the second voice signal acquired by the target audio acquisition device at the historical moment. The second voice signal may include a near-end voice signal, an echo signal, an environmental noise signal, and the like. After the echo cancellation is performed on the second voice signal, it may be considered that the second voice signal no longer includes the echo signal, and an impact of the echo signal can be reduced or eliminated when determining whether there is the near-end voice signal in the second voice signal, so that a determination result is more accurate. In addition, performing echo cancellation on the second voice signal acquired by the target audio acquisition device at the historical moment may be a desirable operation in a voice call. Therefore, the second voice signal obtained after the echo cancellation is selected as a determining object, and no additional processing steps in the voice call are added.

When the method is performed by the server, an interaction process between a corresponding terminal system and the server may include: receiving, by the server at the historical moment, the second voice signal that is transmitted by the terminal system and is acquired by the target audio acquisition device, and determining whether there is the near-end voice signal in the second voice signal.

In an embodiment of the present disclosure, the voice call state includes far-end single talk, near-end single-talk, two-end talk, or no talk.

In an embodiment of the present disclosure, the determining the voice call state at the historical moment according to the first determination result and the second determination result includes: determining that the voice call state at the historical moment is the far-end single talk when or in response to determining the first determination result is that there is a far-end voice signal and the second determination result is that there is no near-end voice signal; determining that the voice call state at the historical moment is the near-end single-talk when or in response to determining the first determination result is that there is no far-end voice signal and the second determination result is that there is a near-end voice signal; determining that the voice call state at the historical moment is the two-end talk when or in response to determining the first determination result is that there is a far-end voice signal and the second determination result is that there is a near-end voice signal; and determining that the voice call state at the historical moment is the no talk when or in response to determining the first determination result is that there is no far-end voice signal and the second determination result is that there is no near-end voice signal.

In certain embodiments, in a voice call, the voice call state may be concluded as four states: the far-end single talk, the near-end single-talk, the two-end talk, and the no talk. In an actual voice call, in certain embodiments, one party speaks and the other party listens. In certain embodiments, two parties speak simultaneously or neither party speaks. The far-end single talk and the near-end single-talk appear more frequently in call states, and the two-end talk or no talk appears less.

In an embodiment of the present disclosure, the determining a target audio acquisition device at the current moment from the audio acquisition devices based on the voice call state at the historical moment and the signal energy of the first voice signals includes: determining an audio acquisition device corresponding to a first voice signal with the lowest signal energy as the target audio acquisition device at the current moment when or in response to determining the voice call state at the historical moment is the far-end single talk; determining an audio acquisition device corresponding to a first voice signal with the highest signal energy as the target audio acquisition device at the current moment when or in response to determining the voice call state at the historical moment is the near-end single-talk; and determining the target audio acquisition device at the historical moment as the target audio acquisition device at the current moment when or in response to determining the voice call state at the historical moment is the two-end talk or no talk.

In certain embodiments, when the voice call state at the historical moment is the far-end single talk, it is estimated that a voice call state at the current moment is also the far-end single talk. First voice signals acquired by the audio acquisition devices in a near-end device include echo signals and environmental noise signals, and signal energy magnitude of the first voice signals are positively correlated with signal energy magnitude of the echo signals included in the first voice signals. To ensure that an echo signal in a voice signal used for subsequent voice enhancement has the lowest signal energy, an audio acquisition device corresponding to a first voice signal with the lowest signal energy is selected and determined as the target audio acquisition device. That is, the first voice signal with the lowest signal energy is used as an input signal for subsequent voice enhancement.

When the voice call state at the historical moment is the near-end single-talk, it is estimated that a voice call state at the current moment is also the near-end single-talk. First voice signals acquired by the audio acquisition devices in a near-end device include near-end voice signals and environmental noise signals, and signal energy magnitude of the first voice signals are positively correlated with signal energy magnitude of the near-end voice signals included in the first voice signals. To ensure that a near-end voice signal in a voice signal used for subsequent voice enhancement has the highest signal energy, an audio acquisition device corresponding to a first voice signal with the highest signal energy is selected and determined as the target audio acquisition device. That is, the first voice signal with the highest signal energy is used as an input signal for subsequent voice enhancement.

When the voice call state at the historical moment is the two-end talk, it is estimated that a voice call state at the current moment is also the two-end talk. Signal energy magnitude of first voice signals acquired by the audio acquisition devices in a near-end device is related to both signal energy magnitude of echo signals and signal energy magnitude of near-end voice signals. In certain embodiments, the signal energy magnitude of the first voice signals cannot be used to determine the signal energy magnitude of the echo signals and near-end voice signals included in the first voice signals. Generally, the two-end talk has a relatively short duration, and to ensure stability of a voice call, it may be ensured that the target audio acquisition device remains unchanged. Therefore, the target audio acquisition device determined at the historical moment is used as the target audio acquisition device at the current moment.

When the voice call state at the historical moment is the no talk, it is estimated that a voice call state at the current moment is also the no talk. First voice signals acquired by audio acquisition devices in a near-end device do not include echo signals and near-end voice signals. Generally, the no talk has a relatively short duration, and to ensure stability of a voice call, it may be ensured that the target audio acquisition device remains unchanged. Therefore, the target audio acquisition device determined at the historical moment is used as the target audio acquisition device at the current moment.

In an embodiment of the present disclosure, if the voice call state at the historical moment is the far-end single talk, the method may further include: determining a quantity of times that the voice call state before the current moment is consecutively the far-end single talk; and determining the target audio acquisition device at the current moment as a target audio acquisition device within the preset period of time after the current moment when or in response to determining the quantity of times is greater than a specified value.

In certain embodiments, in an actual implementation, if during a call, a call state in a long period of time is always the far-end single talk, that is, when a peer-end speaker keeps speaking, it may be considered that the state is still likely to continue during the remaining call. Therefore, when a voice call state is determined at a specific moment, a quantity of times that the state is consecutively the far-end single talk may be recorded. For example, a counter may be disposed. If the call state is the far-end single talk, a value of the counter is increased by 1, if the call state is another call state, the counter is reset, and if the call state is determined as the far-end single talk a next time, the counter starts counting again. If a quantity of consecutive states exceeds a specified value, the target audio acquisition device at the current moment may be directly used as a target audio acquisition device in the remaining call. The target audio acquisition device at the current moment may also be used as a target audio acquisition device for a particular period of time in the remaining call. After the period of time ends, a target audio acquisition device is determined based on the method described in the foregoing embodiment. If the quantity of consecutive states exceeds the specified value, the method described in the foregoing embodiment may be used to determine the target audio acquisition device.

When the method is performed by the server, an interaction process between a corresponding terminal system and the server may include: counting, by the server, call states at moments, and determining the target audio acquisition device at the current moment as a target audio acquisition device within a preset period of time after the current moment if it is determined that the quantity of times that the voice call state before the current moment is consecutively the far-end single talk is greater than the specified value.

In an embodiment of the present disclosure, the method further includes: performing echo cancellation on a first voice signal acquired by the target audio acquisition device at the current moment; and transmitting the first voice signal obtained after the echo cancellation to a far-end device when or in response to determining there is a near-end voice signal in the first voice signal obtained after the echo cancellation.

In certain embodiments, it may be learned from the foregoing description that the first voice signal acquired by the target audio acquisition device may include the near-end voice signal, the echo signal, and the environmental noise signal. Therefore, to avoid echo leakage during a voice call, before transmitting the first voice signal to the far-end device, echo cancellation may need to be performed on the first voice signal. Voice detection is performed on the first voice signal obtained after the echo cancellation. If there is a near-end voice signal in the first voice signal, the near-end voice signal is transmitted to the far-end device. If there is no near-end voice signal in the first voice signal, the first voice signal includes a residual echo signal and the environmental noise signal, and the residual echo signal and the environmental noise signal are not transmitted to the far-end device.

When the method is performed by the server, an interaction process between a corresponding terminal system and the server may include: performing, by the server, echo cancellation on a first voice signal acquired by the target audio acquisition device at the current moment, and transmitting, when or in response to determining there is a near-end voice signal in the first voice signal obtained after the echo cancellation, the near-end voice signal to the far-end device.

In an embodiment of the present disclosure, the performing echo cancellation on a first voice signal acquired by the target audio acquisition device at the current moment includes: obtaining a far-end voice signal at the current moment; determining, based on the far-end voice signal at the current moment and an echo propagation path function at the current moment, an echo signal in the first voice signal acquired by the target audio acquisition device at the current moment; and performing, based on the echo signal, echo cancellation on the first voice signal acquired by the target audio acquisition device at the current moment.

The echo propagation path function may be a mapping relationship between the far-end voice signal and the echo signal received by the audio acquisition device. That is, the far-end voice signal at the current moment is substituted into the echo propagation path function at the current moment to obtain a corresponding echo signal.

In certain embodiments, when there is a far-end voice signal at the current moment, a corresponding echo signal is obtained according to the echo propagation path function, and the echo signal in the first voice signal is removed, to perform echo cancellation of the first voice signal. When there is no far-end voice signal at the current moment, there is no echo signal in the first voice signal, and the first voice signal obtained after the echo cancellation remains unchanged.

In an embodiment of the present disclosure, the method may further include: performing echo cancellation on the second voice signal acquired by the target audio acquisition device at the historical moment, to obtain a residual echo signal at the historical moment; and updating an echo propagation path function at the historical moment based on the residual echo signal at the historical moment, to obtain the echo propagation path function at the current moment.

In certain embodiments, at each moment, there is a specific deviation between an echo signal that is obtained at this moment based on the far-end voice signal and the echo propagation path function at this moment and an actual echo signal at this moment. Therefore, to reduce the deviation between the echo signal obtained at a next moment and the actual echo signal, a residual echo signal obtained after the echo cancellation at each moment may be used to modify a parameter of an echo propagation path function at this moment, that is, to update the parameter to obtain an echo propagation path function at a next moment. In certain embodiments, and when there is no far-end voice signal at the historical moment, there is no echo signal included in the first voice signal, and there is no residual echo signal, so that the echo propagation path function at the current moment is the same as the echo propagation path function at the historical moment.

In an embodiment of the present disclosure, the transmitting the first voice signal obtained after the echo cancellation to a far-end device includes: removing an environmental noise signal and a residual echo signal in the first voice signal obtained after the echo cancellation, and transmitting an obtained voice signal to the far-end device.

In certain embodiments, after the echo cancellation is performed on the first voice signal, to further improve voice call quality, subsequent voice enhancement is also required. The subsequent voice enhancement includes removing the environmental noise signal, the residual echo signal, and the like.

The following uses an example to further describe the embodiments of the present disclosure. The example uses a terminal system as an execution entity for description. It is assumed that a near-end device in a voice call is a mobile phone. In this example, a mobile phone shown in FIG. 1 is used as an example. The mobile phone is provided with two audio acquisition devices, namely, a microphone 201 at the top (referred to as a top microphone) and a microphone 202 at the bottom (referred to as a bottom microphone), and also includes a receiver 203 and a loudspeaker 204. Both the top microphone 201 and the microphone 202 can acquire a first voice signal, and both the receiver 203 and the loudspeaker 204 can play a received far-end voice.

Figure 3:
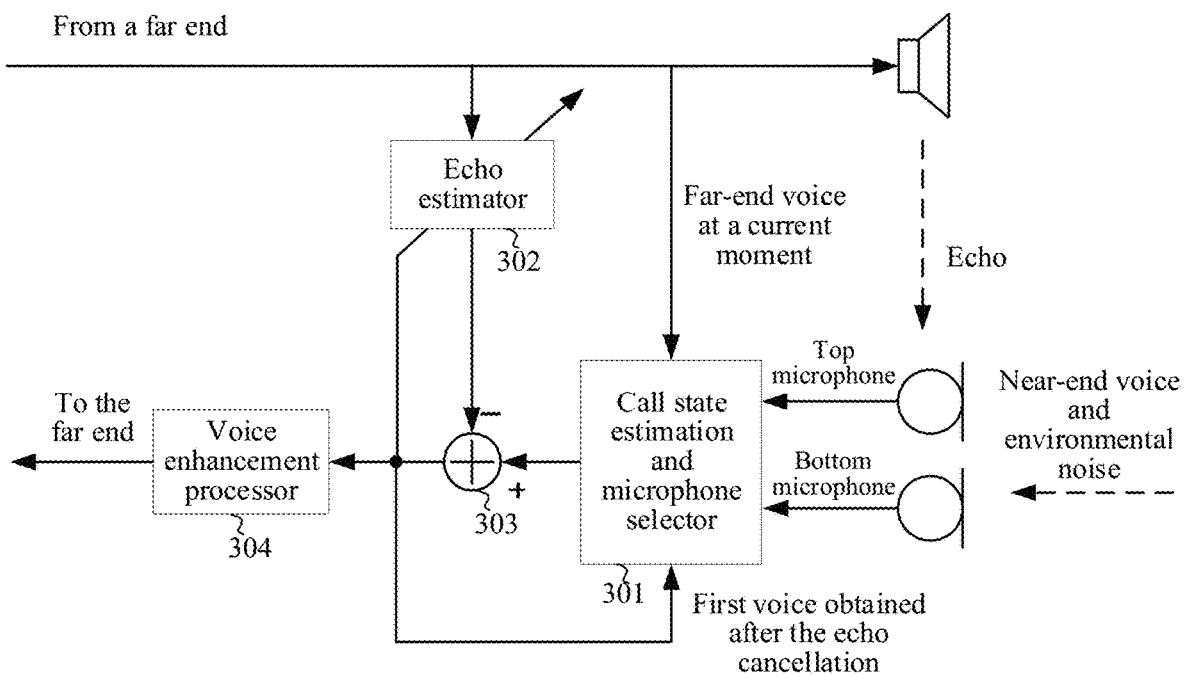
FIG. 3 is a schematic diagram of an implementation process of a voice call according to one or more embodiments of the present disclosure.

FIG. 3 is a schematic diagram of a mechanism for a mobile phone to select a target audio acquisition device in this example. As shown in FIG. 3, the mobile phone may include a call state estimation and microphone selector 301, an echo estimator 302, an echo canceller 303, and a voice enhancement processor 304. The call state estimation and microphone selector 301 is configured to: determine a voice call state at each moment, and determine a target microphone according to a voice call state at a historical moment and signal energy magnitude of voice signals acquired by a top microphone and a bottom microphone at a current moment. The echo estimator 302 is configured to estimate an echo signal at the current moment according to an input far-end voice signal. The echo canceller 303 is configured to perform echo cancellation on an inputted voice signal according to an inputted echo signal. The echo canceller 303 may be an adder, where "−" and "+" respectively represent removal and accumulation of an input signal. The voice enhancement processor 304 is configured to perform subsequent enhancement on the inputted voice signal, including removing a residual echo signal and an environmental noise signal.

The call state estimation and microphone selector 301, the echo estimator 302, and the voice enhancement processor 304 may be physical devices with corresponding functions, or may be applications (APPs) capable of implementing corresponding functions.

Based on the solutions provided in the embodiments of the present disclosure, an implementation process of a voice call in the mobile phone at the current moment may include the following steps:

Step 1-1: The mobile phone plays voice of a far-end speaker through a loudspeaker or a receiver after receiving a far-end voice signal, and a top microphone and a bottom microphone respectively acquire an acoustic signal of a near-end speaker, an acoustic signal of the far-end speaker, and an environmental noise signal, to obtain two corresponding first voice signals, and respectively input the two first voice signal to the call state estimation and microphone selector 301.

Step 1-2: The call state estimation and microphone selector 301 determines a target microphone according to a pre-obtained voice call state at a historical moment and the two first voice signals inputted from the top microphone and the bottom microphone, and inputs the first voice signal acquired by the target microphone to the echo canceller 303.

Step 1-3: The echo estimator 302 estimates and obtains an echo signal according to an inputted far-end voice signal, and inputs the echo signal to the echo canceller 303.

Step 1-4: The echo canceller 303 performs, according to the echo signal inputted by the echo estimator 302, echo cancellation on the first voice signal acquired by the target microphone, and inputs the first voice signal obtained after the echo cancellation to the voice enhancement processor 304.

Step 1-5: The voice enhancement processor 304 performs further voice enhancement on the first voice signal obtained after the echo signal is reduced or eliminated, the voice enhancement including removing the environmental noise signal and a residual echo signal, and transmits the first voice signal obtained after the voice enhancement to a far-end device.

In addition, as shown in the figure, in step 1-4, the echo canceller 303 further inputs the first voice signal obtained after the echo cancellation to the call state estimation and microphone selector 301 and the echo estimator 302, for the call state estimation and microphone selector 301 to determine a voice call state at the current moment according to the inputted signal, to determine a target microphone at a next moment. The echo estimator 302 may update the echo estimator 302 according to a residual echo signal in the first voice signal obtained after the echo cancellation, for example, update an echo propagation path function.

Figure 4:
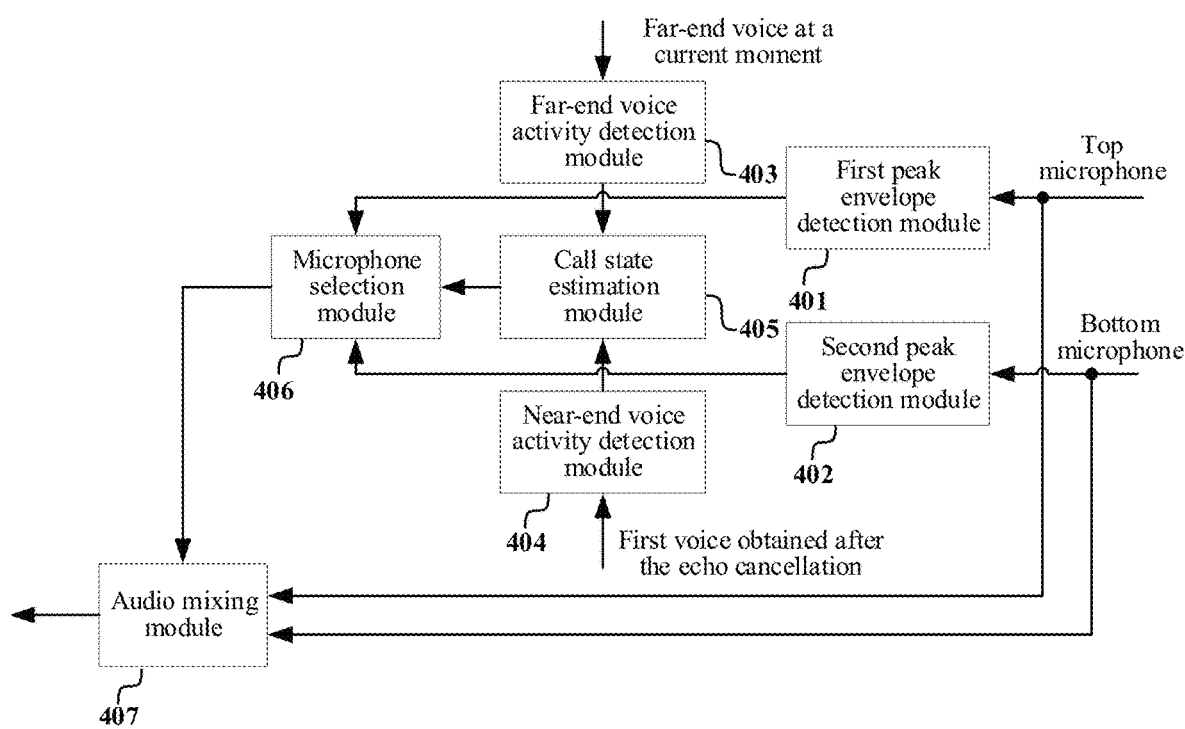
FIG. 4 is a schematic diagram of an implementation process of call state estimation and microphone selection according to one or more embodiments of the present disclosure.

FIG. 4 is an optional schematic structural diagram of a call state estimation and microphone selector. As shown in FIG. 4, the call state estimation and microphone selector may include: a first peak envelope detection module 401, a second peak envelope detection module 402, a far-end voice activity detection module 403, a near-end voice activity detection module 404, a call state estimation module 405, a microphone selection module 406, and an audio mixing module 407.

The first peak envelope detection module 401 is configured to detect a size of a peak envelope of a voice signal acquired by a top microphone. The second peak envelope detection module 402 is configured to detect a size of a peak envelope of a voice signal acquired by a bottom microphone. The far-end voice activity detection module 403 is configured to detect whether there are far-end voice signals at call moments. The near-end voice activity detection module 404 are configured to detect whether there are near-end voice signals at the call moments. The call state estimation module 405 is configured to determine call states at the moments according to whether there are near-end voice signals and whether there are far-end voice signals at the call moments, that is, determine a call state at a corresponding moment according to determination results of the far-end voice activity detection module 403 and the near-end voice activity detection module 404. The microphone selection module 406 is configured to determine a target microphone selection result according to the size of the peak envelope of the inputted voice signal acquired by the top microphone and the size of the peak envelope of the voice signal acquired by the bottom microphone. The audio mixing module 407 is configured to output, according to an inputted target microphone selection result, a first voice signal acquired by the target microphone.

The first peak envelope detection module 401, the second peak envelope detection module 402, the far-end voice activity detection module 403, the near-end voice activity detection module 404, the call state estimation module 405, the microphone selection module 406, and the audio mixing module 407 may be physical devices with corresponding functions, or may be APPs capable of implementing corresponding functions. Based on the structure shown in FIG. 4, a process of determining the target microphone of the mobile phone at the current moment may include the following steps:

Step 2-1: The first peak envelope detection module 401 detects a size of a peak envelope of a first voice signal acquired by a top microphone, the second peak envelope detection module 402 detects a size of a peak envelope of a first voice signal acquired by a bottom microphone, and the sizes of the two peak envelopes are respectively inputted to the microphone selection module 406.

Step 2-2: The microphone selection module 406 determines a target microphone selection result according to a voice call state at a historical moment determined by the call state estimation module 405 and the sizes of the two inputted peak envelopes, and inputs the target microphone selection result to the audio mixing module 407.

In certain embodiments, when determining the voice call state at the historical moment, the call state estimation module 405 determines the voice call state at the historical moment according to a first determination result that is determined by the far-end voice activity detection module 403 and is about whether there is a far-end voice signal at the historical moment and a second determination result that is determined by the near-end voice activity detection module 404 is about whether there is a near-end voice signal at the historical moment.

If the voice call state at the historical moment is the far-end single talk, the microphone selection module 406 determines a microphone corresponding to a first voice signal with lower signal energy as the target microphone. If the voice call state at the historical moment is the near-end single-talk, the microphone selection module 406 determines a microphone corresponding to a first voice signal with higher signal energy as the target microphone. If the voice call state at the historical moment is the two-end talk or no talk, the microphone selection module 406 determines a target microphone determined at the historical moment as a target microphone.

Step 2-3: The audio mixing module 407 performs, according to the inputted target microphone selection result, mixing and routing on the first voice signals acquired by the two microphones, and outputs a voice signal of the target microphone. When switching from one microphone signal to another microphone signal, a smooth transition time window may be set to ensure continuous transition.

In addition, the call state estimation module 405 may also need to further determine a voice call state at the current moment for selection of the target microphone at a next moment. The process may include the following steps:

Step 3-1: The far-end voice activity detection module 403 determines, according to an inputted far-end voice signal (the far-end voice shown in the figure) at the current moment, whether there is a far-end voice signal at the current moment, the near-end voice activity detection module 404 determines, according to an inputted first voice signal (first voice obtained after the echo cancellation shown in the figure) that is obtained after the echo cancellation and is acquired by the target microphone at the current moment, whether there is a near-end voice signal at the current moment, and two determination results are respectively inputted to the call state estimation module 405.

Step 3-2: The call state estimation module 405 determines the voice call state at the current moment according to the two inputted determination results.

In certain embodiments, if there is a far-end voice signal and there is no near-end voice signal, the voice call state at the current moment is far-end single talk. If there is no far-end voice signal and there is a near-end voice signal, the voice call state at the current moment is near-end single-talk. If there is a far-end voice signal and there is a near-end voice signal, the voice call state at the current moment is two-end talk. If there is no far-end voice signal and there is no near-end voice signal, the voice call state at the current moment is the no talk.

In the solutions provided in the embodiments of the present disclosure, the voice signals acquired by a plurality audio acquisition devices of the terminal system, a voice signal played by the audio playback device, and the call states of the device are comprehensively analyzed, the selection of the target audio acquisition device is realized. Compared with the related art, the solutions can effectively improve overall performance of the voice call.

Figure 5:
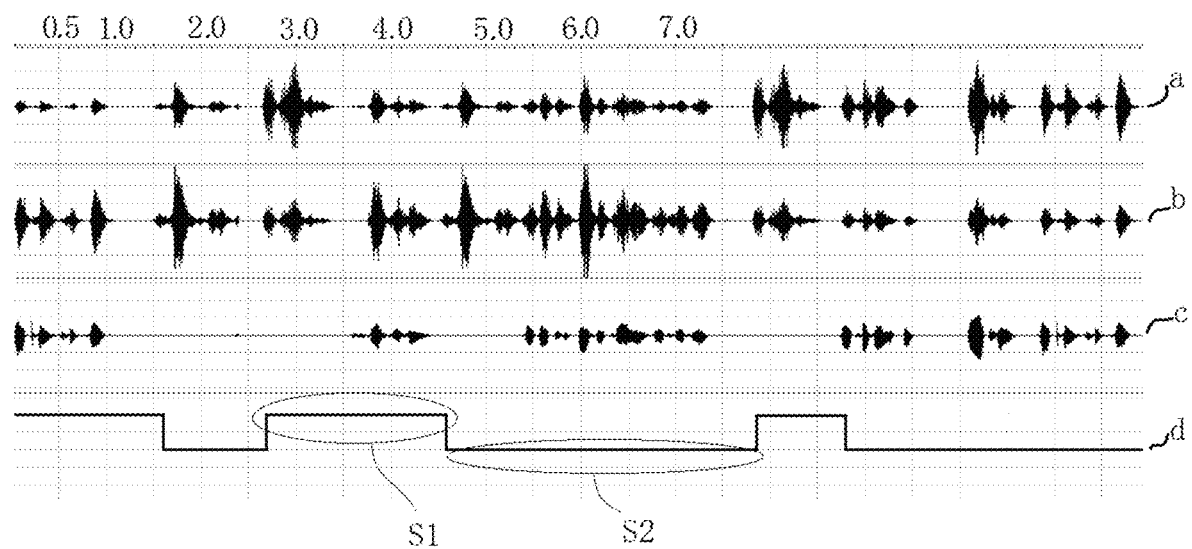
FIG. 5 is a schematic diagram of a target microphone selection result according to one or more embodiments of the present disclosure.

In an example, based on the voice call solution provided in the embodiments of the present disclosure, this example uses the terminal system as an execution entity for description. FIG. 5 is a schematic effect diagram of a terminal system for microphone selection in a hands-free call scenario. The mobile phone includes two microphones, a microphone a and a microphone b. When the mobile phone makes a voice call in a hands-free scenario, a time-domain waveform of a voice signal acquired by the microphone a is shown by a waveform a in the figure, a time-domain waveform of a voice signal acquired by the microphone b is shown by a waveform b in the figure, a time-domain waveform of a voice signal played by a loudspeaker is shown by a waveform c in the figure, and a target microphone selection result is shown by a curve d in the figure. In this example, a result shown by S1 in the curve d indicates that the target microphone is a, and a result shown by S2 in the curve d indicates that the target microphone is b. In the schematic diagram, a horizontal coordinate indicates time (only part of the time is shown in the figure), and a unit is seconds (s). For the waveform a to the waveform c, a vertical coordinate indicates signal energy magnitude, an amplitude of a signal.

In certain embodiments, in this example, assuming that an interval between two adjacent moments is 0.1 s, in the 0th s to the 1st s of a voice call, it may be learned from the curve d that the microphone a is selected as the target microphone in this period of time. A specific selection process is as follows. For any moment in the period of time from the 0th s to the 1st s, for example, the 0.3rd s, a historical moment is the 0.2nd s. An actual voice detection result at the 0.2nd s is: at this moment, there is no near-end voice signal and there is a far-end voice signal, a voice call state at the 0.2nd s is determined as far-end single talk, and a microphone corresponding to a voice signal with lower signal energy at the 0.3rd s is selected as the target microphone. It may be learned from the waveform a and waveform b that at the 0.3rd s, signal energy of a voice signal acquired by the microphone a is less than signal energy of a voice signal acquired by the microphone b, and at the 0.3rd s, the microphone a is selected as the target microphone.

In another example, in the 1st s to the 1.5th s of the voice call, an actual detection result of a voice signal is that there is no far-end voice signal and there is no near-end voice signal. It may also be seen from the waveforms of the waveform a and the waveform b in the figure that the two microphones basically acquire no signal during this period of time, and there is no far-end voice signal in actual detection. That is, the far-end voice signal is not received, the loudspeaker does not play the voice signal, and it may be determined that the voice call state at each moment within the period of time is the no talk, so that a target microphone at a historical moment may be determined as a target microphone at a current moment. That is, at the each moment in this period of time, the microphone a is still selected as the target microphone.

In still another example, in a period of time from the 1.5th s to the 2.4th s of the voice call, it may be learned from the curve d that a target microphone in this period of time is the microphone b, and a selection process of the target microphone is as follows. An actual voice detection result in this period of time is: there is a near-end voice signal and there is no far-end voice signal, and it may be determined that a voice call state at moments in this period of time is near-end single-talk, so that a microphone that acquires a voice signal with higher signal energy may need to be selected from the two microphones as the target microphone at the moments in this period of time. It may be learned from the waveform a and waveform b that in this period of time, energy of a voice signal acquired by the microphone b is higher than energy of a voice signal acquired by the microphone a, so that at each moment in this period of time, the microphone b is selected as the target microphone.

In still another example, in a period of time from the 3.6th s to the 4.6th s of the voice call, the 4.1st s is used as an example, and a historical moment corresponding to the 4.1st s is the 4.0th s. A time detection result corresponding to the 4.0th s is that there is both a near-end voice signal and a far-end voice signal. A voice call state at the 4.0th s is determined as two-end talk. A target microphone of the historical moment is determined as a target microphone at a current moment. That is, a target microphone, that is, the microphone a at the 4.0th s, is used as a target microphone at the 4.1st s.

Similarly, based on the solutions provided in the embodiments of the present disclosure, the selection of the target microphone at moments of the voice call in the foregoing examples may be implemented, and details are not described herein again. Upon experimental verification, a corresponding target microphone may be selected in a specific voice call state by using the solutions provided in the present disclosure, thereby effectively improving a voice call effect.

Figure 6:
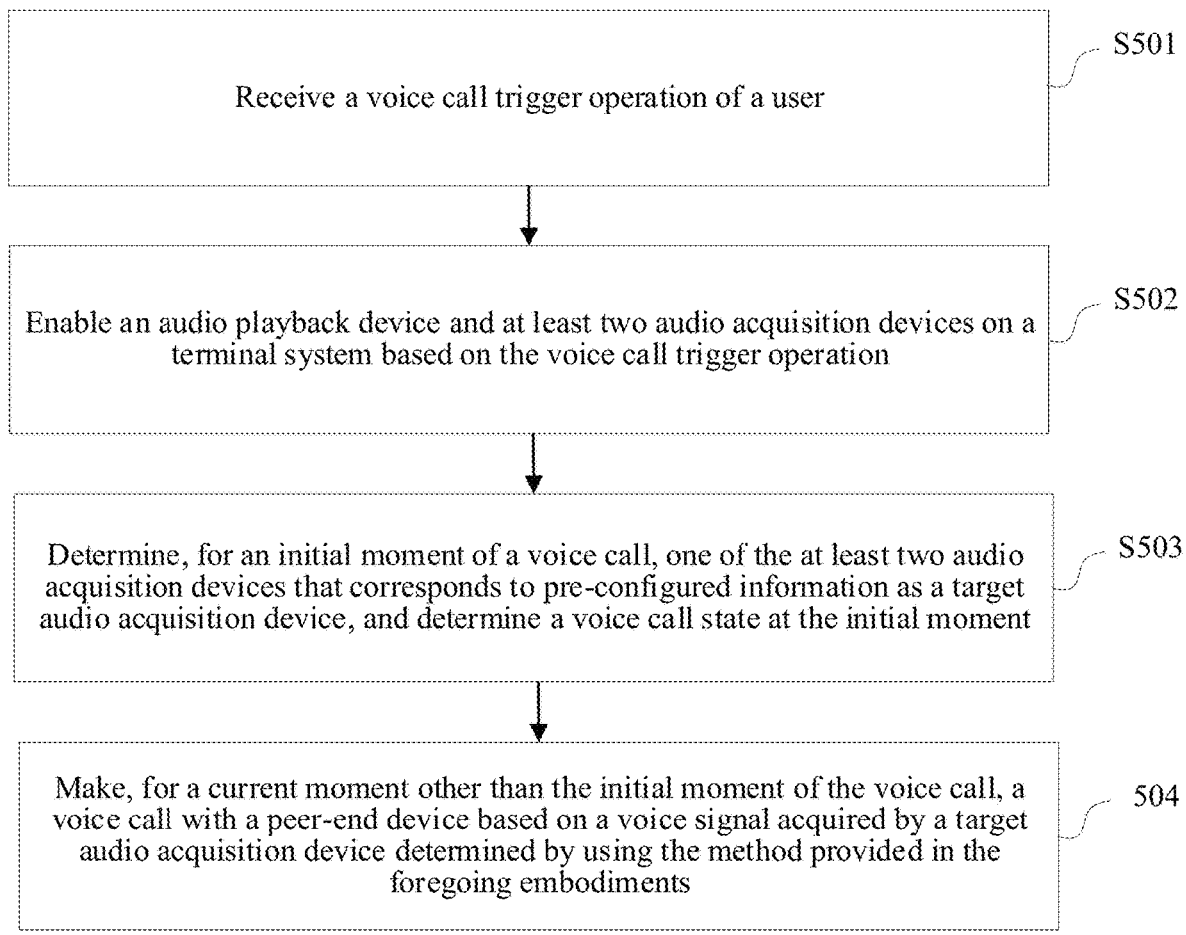
FIG. 6 is a schematic flowchart of a voice call method according to one or more embodiments of the present disclosure.

FIG. 6 is a schematic flowchart of a voice call method according to an embodiment of the present disclosure. As shown in FIG. 6, the method may include the following steps:

Step 501: Receive a voice call trigger operation of a user.

The voice call trigger operation refers to an instruction to start a voice call, which may be a tap operation of the user on a corresponding voice call APP, or may be an instruction of the user to start a voice call through voice or text input.

Step 502: Enable an audio playback device and at least two audio acquisition devices on a terminal system based on the voice call trigger operation.

A specific device type of a terminal device is not limited in this embodiment of the present disclosure, provided that the terminal device is a device that can make a voice call. The terminal device includes, but is not limited to, a mobile phone, a PAD, and the like. The audio playback device provided on the terminal system may be a loudspeaker, and the audio acquisition device may be a microphone. Specific types and specific quantities of the audio playback device and the at least two audio acquisition devices, and positions of the audio acquisition devices on the terminal system are not limited in this embodiment of the present disclosure.

In an actual implementation, the terminal system may provide a corresponding interaction interface for a voice call. A corresponding position on the interaction interface may display an icon of the voice playback device and icons of the at least two audio acquisition devices. A color or shape of the icon indicates an on or off state of a corresponding device.

Step 503: Determine, for an initial moment of a voice call, one of the at least two audio acquisition devices that corresponds to pre-configured information as a target audio acquisition device, and determine a voice call state at the initial moment.

In certain embodiments, the target audio acquisition device corresponding to the pre-configured information may be pre-designated or may be any one of the at least two audio acquisition devices, or may be selected in an existing manner of determining a target audio acquisition device. For example, the target audio acquisition device at the initial moment is determined based on a call scenario.

Step 504: Make, for a current moment other than the initial moment of the voice call, a voice call with a peer-end device based on a voice signal acquired by a target audio acquisition device determined by using the method provided in the foregoing embodiments.

In the voice call method provided in the embodiments of the present disclosure, the voice call state at the historical moment is used, and the signal energy of the voice signals acquired by the audio acquisition devices is combined, to determine an audio acquisition device corresponding to a voice signal that better facilitates subsequent voice enhancement in a specific voice call state as the target audio acquisition device at the current moment. The process of determining the target audio acquisition device does not depend on only the signal energy of the voice signals acquired by the audio acquisition devices or the call scenario of the near-end device, thereby avoiding a problem that an echo is relatively strong or a near-end voice is relatively weak in the voice signal acquired by the target audio acquisition device determined in the related art and improving a voice call effect.

Figure 7:
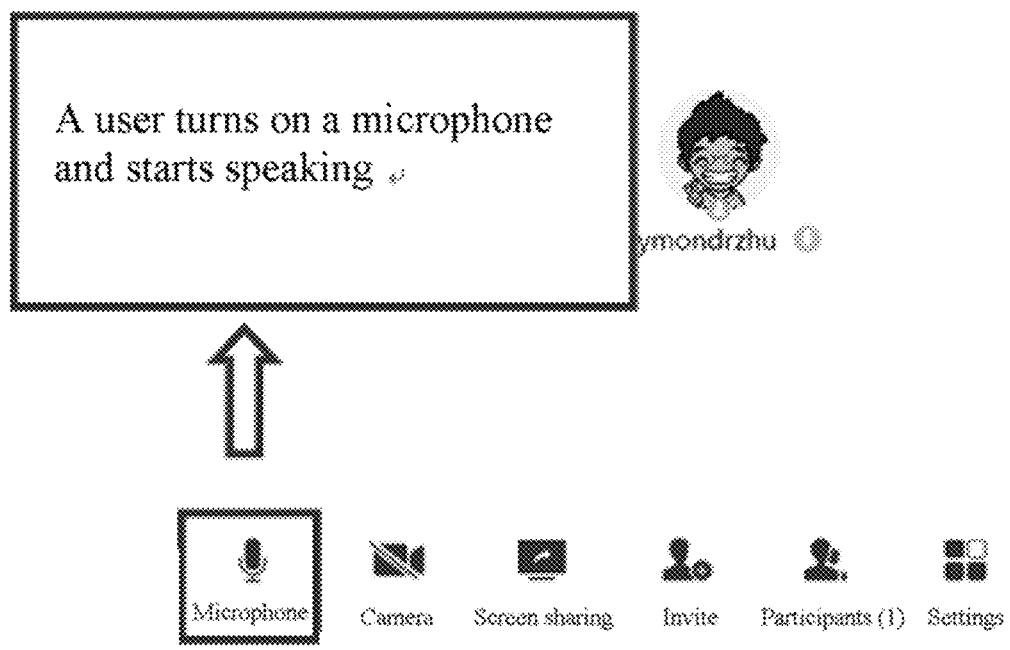
FIG. 7 is a schematic diagram of an implementation scenario according to one or more embodiments of the present disclosure.

The voice call method provided in the embodiments of the present disclosure may be applied to any terminal system with a plurality of microphones (dual microphones are used as an example) during a voice call, for example, may be applied to a related APP involving a voice call scenario, the dual microphones on the terminal system are used to suppress an echo during the call, thereby enhancing near-end voice volume and improving call quality. A voice conference APP is used as an example. In certain embodiments, as shown in FIG. 7, after opening an APP, a user (a head portrait in the figure represents a current user) may enter a conference interface, and after turning on a microphone, the user may start speaking. As shown in the figure, the user can also invite (by tapping an invite button) other users to participate in a session on the conference interface, and can also share screens, record videos by turning on a camera, and make APP settings. In certain embodiments, a voice of the user is acquired by the two microphones on the terminal system, and after being played by a device, voices of other online users are also acquired by the microphones. Therefore, the other online users can hear their own voices, that is, an echo. An echo canceller may be built in the APP, to reduce or eliminate the echo of other users acquired by the microphones, and only retain the voice of a local user to enhance conference experience. In a process of a voice call, a target microphone may be selected by using a dual-microphone voice enhancement module (which may be configured to determine a target microphone, transmit a voice signal, and the like) of the terminal system, and based on a voice signal acquired by a selected microphone, the voice signal is transmitted to terminal systems of other users. In an actual implementation, the dual-microphone voice enhancement module may be turned on or off with the microphone turned on or off or automatically turned on or off, and the user does not need to perform other operations such as switching the microphone.

Figure 8:
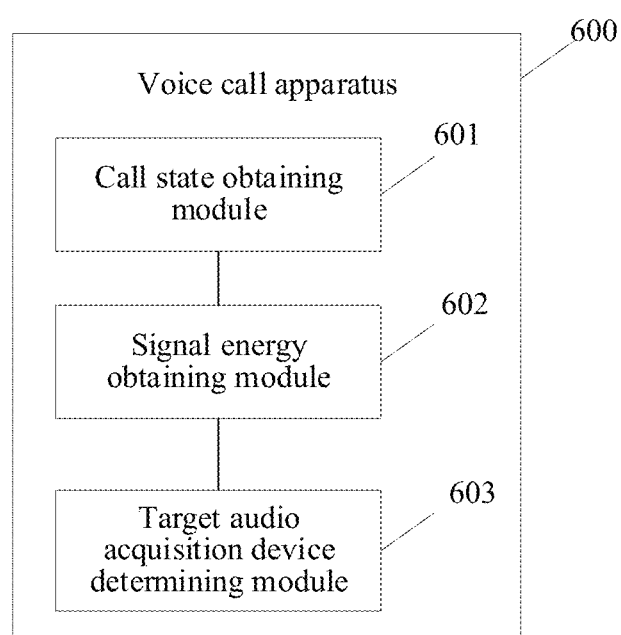
FIG. 8 is a structural block diagram of a voice call apparatus according to one or more embodiments of the present disclosure.

For the voice call method provided in the embodiments of the present disclosure, the embodiments of the present disclosure further provide a voice call apparatus. As shown in FIG. 8, the apparatus 600 may include a call state obtaining module 601, a signal energy obtaining module 602, and a target audio acquisition device determining module 603.

The call state obtaining module 601 is configured to obtain a voice call state of a terminal system at a historical moment, the terminal system being provided with at least two audio acquisition devices.

The signal energy obtaining module 602 is configured to: obtain first voice signals acquired by the audio acquisition devices at a current moment, and determine signal energy of the first voice signals.

The target audio acquisition device determining module 603 is configured to determine a target audio acquisition device from the audio acquisition devices based on the voice call state at the historical moment and the signal energy of the first voice signals.

In the voice call apparatus provided in the embodiments of the present disclosure, the voice call state at the historical moment is used, and the signal energy of the voice signals acquired by the audio acquisition devices is combined, to determine an audio acquisition device corresponding to a voice signal that better facilitates subsequent voice enhancement in a specific voice call state as the target audio acquisition device at the current moment. The process of determining the target audio acquisition device does not depend on only the signal energy of the voice signals acquired by the audio acquisition devices or the call scenario of the near-end device, thereby avoiding a problem that an echo is relatively strong or a near-end voice is relatively weak in the voice signal acquired by the target audio acquisition device determined in the related art and improving a voice call effect.

In an embodiment of the present disclosure, the apparatus further includes a call state determining module, and the call state determining module is configured to determine a voice call state of the terminal system. When determining the voice call state at the historical moment, the module is configured to: determine whether there is a far-end voice signal at the historical moment, to obtain a first determination result; determine whether there is a near-end voice signal at the historical moment, to obtain a second determination result; and determine the voice call state at the historical moment according to the first determination result and the second determination result.

In an embodiment of the present disclosure, when determining whether there is a near-end voice signal at the historical moment, the call state determining module is configured to: obtain a second voice signal acquired by the target audio acquisition device at the historical moment; and perform echo cancellation on the second voice signal, to determine whether there is a near-end voice signal in the second voice signal obtained after the echo cancellation.

In an embodiment of the present disclosure, the voice call state includes far-end single talk, near-end single-talk, two-end talk, or no talk.

In an embodiment of the present disclosure, when determining the voice call state at the historical moment according to the first determination result and the second determination result, the call state determining module is configured to: determine that the voice call state at the historical moment is the far-end single talk when or in response to determining the first determination result is that there is a far-end voice signal and the second determination result is that there is no near-end voice signal; determine that the voice call state at the historical moment is the near-end single-talk when or in response to determining the first determination result is that there is no far-end voice signal and the second determination result is that there is a near-end voice signal; determine that the voice call state at the historical moment is the two-end talk when or in response to determining the first determination result is that there is a far-end voice signal and the second determination result is that there is a near-end voice signal; and determine that the voice call state at the historical moment is the no talk when or in response to determining the first determination result is that there is no far-end voice signal and the second determination result is that there is no near-end voice signal.

In an embodiment of the present disclosure, the target audio acquisition device determining module 603 is configured to: determine an audio acquisition device corresponding to a first voice signal with the lowest signal energy as the target audio acquisition device at the current moment when or in response to determining the voice call state at the historical moment is the far-end single talk; determine an audio acquisition device corresponding to a first voice signal with the highest signal energy as the target audio acquisition device at the current moment when or in response to determining the voice call state at the historical moment is the near-end single-talk; and determine the target audio acquisition device at the historical moment as the target audio acquisition device at the current moment when or in response to determining the voice call state at the historical moment is the two-end talk or no talk.

In an embodiment of the present disclosure, the target audio acquisition device determining module 603 is further configured to: determine a quantity of times that the voice call state before the current moment is consecutively the far-end single talk when or in response to determining the voice call state at the historical moment is the far-end single talk; and determine the target audio acquisition device at the current moment as a target audio acquisition device after the current moment when or in response to determining the quantity of times is greater than a specified value.

In an embodiment of the present disclosure, the apparatus further includes a signal transmission module, configured to: perform echo cancellation on a first voice signal acquired by the target audio acquisition device at the current moment; and transmit the first voice signal obtained after the echo cancellation to a peer-end device of a voice call when or in response to determining there is a near-end voice signal in the first voice signal obtained after the echo cancellation.

In an embodiment of the present disclosure, when performing echo cancellation on the first voice signal acquired by the target audio acquisition device at the current moment, the signal transmission module is configured to: obtain a far-end voice signal at the current moment; determine, based on the far-end voice signal at the current moment and an echo propagation path function at the current moment, an echo signal in the first voice signal acquired by the target audio acquisition device at the current moment; and perform, based on the echo signal, echo cancellation on the first voice signal acquired by the target audio acquisition device at the current moment.

In an embodiment of the present disclosure, the echo propagation path function at the current moment is obtained in the following manner: performing echo cancellation on the second voice signal acquired by the target audio acquisition device at the historical moment, to obtain a residual echo signal at the historical moment; and updating an echo propagation path function at the historical moment based on the residual echo signal at the historical moment, to obtain the echo propagation path function at the current moment.

Figure 9:
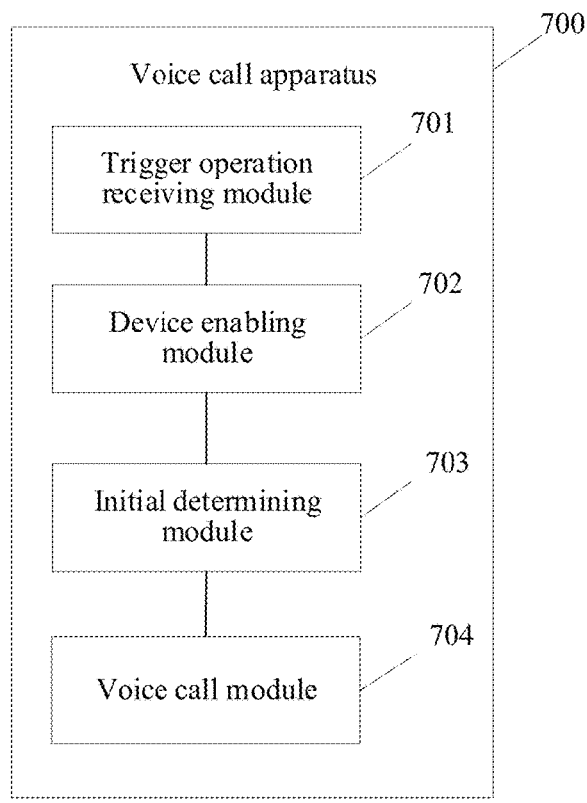
FIG. 9 is a structural block diagram of a voice call apparatus according to one or more embodiments of the present disclosure.

FIG. 9 is a structural block diagram of a voice call apparatus according to an embodiment of the present disclosure. As shown in FIG. 9, the apparatus 700 may include a trigger operation receiving module 701, a device enabling module 702, an initial determining module 703, and a voice call module 704.

The trigger operation receiving module 701 is configured to receive a voice call trigger operation of a user.

The device enabling module 702 is configured to enable an audio playback device and at least two audio acquisition devices on a terminal system based on the voice call trigger operation.

The initial determining module 703 is configured to: determine, for an initial moment of a voice call, one of the at least two audio acquisition devices that corresponds to pre-configured information as a target audio acquisition device, and determine a voice call state at the initial moment.

The voice call module 704 is configured to make, for a current moment other than the initial moment of the voice call, a voice call with a peer-end device based on a voice signal acquired by a target audio acquisition device determined by using the method according to the first aspect, any optional embodiment of the first aspect, or the third aspect.

In the voice call apparatus provided in the embodiments of the present disclosure, the voice call state at the historical moment is used, and the signal energy of the voice signals acquired by the audio acquisition devices is combined, to determine an audio acquisition device corresponding to a voice signal that better facilitates subsequent voice enhancement in a specific voice call state as the target audio acquisition device at the current moment. The process of determining the target audio acquisition device does not depend on only the signal energy of the voice signals acquired by the audio acquisition devices or the call scenario of the near-end device, thereby avoiding a problem that an echo is relatively strong or a near-end voice is relatively weak in the voice signal acquired by the target audio acquisition device determined in the related art and improving a voice call effect.

In certain embodiments, the present disclosure further provide an electronic device, including a memory, a processor, an audio playback device, and at least two audio acquisition devices. The audio playback device is configured to play a voice signal, the at least two audio acquisition devices are configured to acquire voice signals, the memory stores a computer program, the processor executing the computer program to implement the method provided in any embodiment of the present disclosure. The following implementations may be carried out.

Implementation I: Obtain a voice call state of a terminal system at a historical moment, the terminal system being provided with at least two audio acquisition devices; obtain first voice signals acquired by the audio acquisition devices at a current moment, and determine signal energy of the first voice signals; and determine a target audio acquisition device at the current moment from the audio acquisition devices based on the voice call state at the historical moment and the signal energy of the first voice signals.

Implementation II: Receive a voice call trigger operation of a user; enable an audio playback device and at least two audio acquisition devices on a terminal system based on the voice call trigger operation; determine, for an initial moment of a voice call, one of the at least two audio acquisition devices that corresponds to pre-configured information as a target audio acquisition device, and determine a voice call state at the initial moment; and make, for a current moment other than the initial moment of the voice call, a voice call with a peer-end device based on a voice signal acquired by a target audio acquisition device determined by using the method provided in Implementation I.

The embodiments of the present disclosure further provide a computer-readable storage medium, storing a computer program, the program, when being executed by a processor, implementing the method shown in any embodiment of the present disclosure. In certain embodiments, the computer-readable storage medium stores a computer program corresponding to the voice call method provided in any embodiment of the present disclosure.

Figure 10:
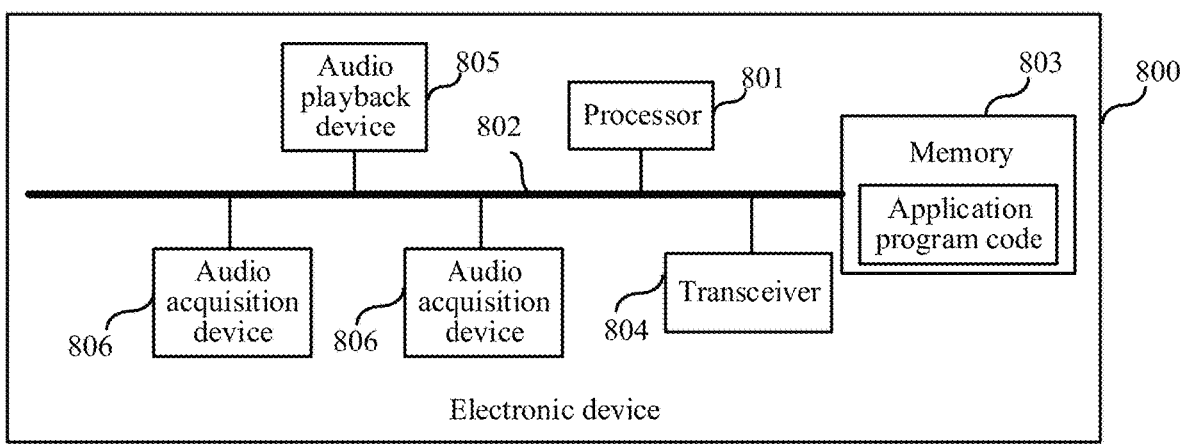
FIG. 10 is a schematic structural diagram of an electronic device according to one or more embodiments of the present disclosure.

FIG. 10 is a schematic structural diagram of an electronic device to which the embodiments of the present disclosure are applicable. As shown in FIG. 10, the electronic device 800 shown in FIG. 10 includes a processor 801, a memory 803, an audio playback device 805, and at least two audio acquisition devices 806. The processor 801, the audio playback device 805, and the at least two audio acquisition devices 806 are connected to the memory 803, for example, are connected by a bus 802. Further, the electronic device 800 may further include a transceiver 804. The electronic device 800 may perform data exchange with another electronic device through the transceiver 804. In an actual implementation, there may be one or more transceivers 804. The structure of the electronic device 800 does not constitute a limitation on this embodiment of the present disclosure.

The processor 801 is applied to this embodiment of the present disclosure, to implement functions of the voice call apparatus shown in FIG. 8 or FIG. 9.

The processor 801 may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or perform various examples of logic blocks, modules, and circuits described with reference to content disclosed in the present disclosure. The processor 801 may be alternatively a combination to implement a computing function, for example, may be a combination of one or more microprocessors, or a combination of a DSP and a microprocessor.

The bus 802 may include a channel, to transmit information between the foregoing components. The bus 802 may be a PCI bus, an EISA bus, or the like. The bus 802 may be classified into an address bus, a data bus, a control bus, and the like. For ease of description, the bus in FIG. 10 is represented by using only one bold line, but which does not indicate that there is only one bus or one type of bus.

The memory 803 may be a read-only memory (ROM) or another type of static storage device that can store static information and a static instruction; or a random access memory (RAM) or another type of dynamic storage device that can store information and an instruction; or may be an electrically erasable programmable read-only memory (EEPROM), a CD-ROM or another compact-disc storage medium, optical disc storage medium (including a compact disc, a laser disk, an optical disc, a digital versatile disc, a Blu-ray disc, or the like) and magnetic disk storage medium, another magnetic storage device, or any other medium that can be configured to carry or store expected program code in a form of an instruction or a data structure and that is accessible by a computer, but is not limited thereto.

The memory 803 is configured to store application program codes for performing the solutions of the present disclosure, and is controlled and executed by the processor 801. The processor 801 is configured to execute application program codes stored in the memory 803 to implement actions of the voice call apparatus provided in the embodiment shown in FIG. 8 or FIG. 9.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In certain embodiments, although the steps in the flowchart in the accompanying drawings are sequentially shown according to indication of an arrow, the steps are not necessarily sequentially performed according to a sequence indicated by the arrow. Unless explicitly specified in the present disclosure, execution of the steps is not strictly limited in the sequence, and the steps may be performed in other sequences. In addition, at least some steps in the flowcharts in the accompanying drawings may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the another step.

The foregoing descriptions are some implementations of the present disclosure. A person of ordinary skill in the art may make several improvements and refinements without departing from the principle of the present disclosure, and the improvements and refinements shall fall within the protection scope of the present disclosure.

What is claimed is:

1. A voice call method, comprising:
   obtaining a voice call state of a terminal system at a historical moment, the terminal system being provided with at least two audio acquisition devices;
   obtaining first voice signals acquired by the at least two audio acquisition devices at a current moment, and determining signal energy of the first voice signals; and
   determining a target audio acquisition device at the current moment from the at least two audio acquisition devices based on the voice call state at the historical moment and the signal energy of the first voice signals, comprising: determining that the voice call state at the historical moment is far-end single talk:
      determining an audio acquisition device corresponding to a first voice signal with the lowest signal energy as the target audio acquisition device at the current moment;
      determining a quantity of times that the voice call state before the current moment is consecutively the far-end single talk; and
      determining the target audio acquisition device at the current moment as the target audio acquisition device after the current moment in response to the quantity of times being greater than a specified value.

2. The method according to claim 1, wherein performing the echo cancellation on the first voice signal comprises:
   obtaining a far-end voice signal at the current moment;
   determining, based on the far-end voice signal at the current moment and an echo propagation path function at the current moment, an echo signal in the first voice signal acquired by the target audio acquisition device at the current moment; and
   performing, based on the echo signal, echo cancellation on the first voice signal acquired by the target audio acquisition device at the current moment.

3. The method according to claim 2, wherein the echo propagation path function at the current moment is obtained by:
   performing echo cancellation on the second voice signal acquired by the target audio acquisition device at the historical moment, to obtain a residual echo signal at the historical moment; and
   updating an echo propagation path function at the historical moment based on the residual echo signal at the historical moment, to obtain the echo propagation path function at the current moment.

4. The method according to claim 1, further comprising:
   receiving a voice call trigger operation of a user;
   enabling an audio playback device and the at least two audio acquisition devices on the terminal system based on the voice call trigger operation;
   determining, for an initial moment of a voice call, one of the at least two audio acquisition devices that corresponds to pre-configured information as the target audio acquisition device, and determining the voice call state at the initial moment; and
   making, for the current moment other than the initial moment of the voice call, a voice call with a peer-end device based on a voice signal acquired by the target audio acquisition device.

5. A voice call apparatus, comprising: at least one memory storing computer program instructions; and at least one processor coupled to the at least one memory and configured to execute the computer program instructions and perform:
   obtaining a voice call state of a terminal system at a historical moment, the terminal system being provided with at least two audio acquisition devices;
   obtaining first voice signals acquired by the at least two audio acquisition devices at a current moment, and determining signal energy of the first voice signals; and
   determining a target audio acquisition device at the current moment from the at least two audio acquisition devices based on the voice call state at the historical moment and the signal energy of the first voice signals, comprising:
      in response to the voice call state at the historical moment being far-end single talk:
         determining an audio acquisition device corresponding to a first voice signal with the lowest signal energy as the target audio acquisition device at the current moment;
         determining a quantity of times that the voice call state before the current moment is consecutively the far-end single talk; and
         determining the target audio acquisition device at the current moment as the target audio acquisition device after the current moment in response to the quantity of times being greater than a specified value,
      in response to the voice call state at the historical moment being near-end single-talk, determining an audio acquisition device corresponding to a first voice signal with the highest signal energy as the target audio acquisition device at the current moment and in response to the voice call state at the historical moment being two-end talk or no talk, determining the target audio acquisition device at the historical moment as the target audio acquisition device at the current moment.

6. The voice call apparatus according to claim 5, wherein the voice call state at the historical moment is determined by:

determining whether there is a far-end voice signal at the historical moment, to obtain a first determination result;

determining whether there is a near-end voice signal at the historical moment, to obtain a second determination result; and determining the voice call state at the historical moment according to the first determination result and the second determination result.

7. The voice call apparatus according to claim 6, wherein determining whether there is the near-end voice signal at the historical moment comprises:

obtaining a second voice signal acquired by the target audio acquisition device at the historical moment; and performing echo cancellation on the second voice signal, to determine whether there is the near-end voice signal in the second voice signal obtained after the echo cancellation.

8. The voice call apparatus according to claim 5, wherein determining the voice call state at the historical moment comprises one or more of:

determining that the voice call state at the historical moment is the far-end single talk in response to determining the first determination result shows there is a far-end voice signal and the second determination result shows there is no near-end voice signal;

determining that the voice call state at the historical moment is the near-end single-talk in response to determining the first determination result shows there is no far-end voice signal and the second determination result shows there is a near-end voice signal;

determining that the voice call state at the historical moment is the two-end talk in response to determining the first determination result shows there is a far-end voice signal and the second determination result shows there is a near-end voice signal; and determining that the voice call state at the historical moment is the no talk in response to determining the first determination result shows there is no far-end voice signal and the second determination result shows there is no near-end voice signal.

9. The voice call apparatus according to claim 5, wherein the at least one processor is further configured to execute the computer program instructions and perform:

performing echo cancellation on a first voice signal acquired by the target audio acquisition device at the current moment; and transmitting the first voice signal obtained after the echo cancellation to a peer-end device of a voice call in response to determining there is a near-end voice signal in the first voice signal obtained after the echo cancellation.

10. A non-transitory computer-readable storage medium storing computer program instructions executable by at least one processor to perform:

obtaining a voice call state of a terminal system at a historical moment, the terminal system being provided with at least two audio acquisition devices;

obtaining first voice signals acquired by the at least two audio acquisition devices at a current moment, and determining signal energy of the first voice signals; and determining a target audio acquisition device at the current moment from the at least two audio acquisition devices based on the voice call state at the historical moment and the signal energy of the first voice signals, comprising:

in response to the voice call state at the historical moment being far-end single talk:

determining an audio acquisition device corresponding to a first voice signal with the lowest signal energy as the target audio acquisition device at the current moment;

determining a quantity of times that the voice call state before the current moment is consecutively the far-end single talk; and determining the target audio acquisition device at the current moment as the target audio acquisition device after the current moment in response to the quantity of times being greater than a specified value, in response to the voice call state at the historical moment being near-end single-talk, determining an audio acquisition device corresponding to a first voice signal with the highest signal energy as the target audio acquisition device at the current moment and in response to the voice call state at the historical moment being two-end talk or no talk, determining the target audio acquisition device at the historical moment as the target audio acquisition device at the current moment.

11. The voice call apparatus according to claim 9, wherein performing the echo cancellation on the first voice signal comprises:

obtaining a far-end voice signal at the current moment;

determining, based on the far-end voice signal at the current moment and an echo propagation path function at the current moment, an echo signal in the first voice signal acquired by the target audio acquisition device at the current moment; and performing, based on the echo signal, echo cancellation on the first voice signal acquired by the target audio acquisition device at the current moment.

12. The voice call apparatus according to claim 11, wherein the echo propagation path function at the current moment is obtained by:

performing echo cancellation on the second voice signal acquired by the target audio acquisition device at the historical moment, to obtain a residual echo signal at the historical moment; and updating an echo propagation path function at the historical moment based on the residual echo signal at the historical moment, to obtain the echo propagation path function at the current moment.

13. The voice call apparatus according to claim 5, wherein the at least one processor is further configured to execute the computer program instructions and perform:

receiving a voice call trigger operation of a user;

enabling an audio playback device and the at least two audio acquisition devices on the terminal system based on the voice call trigger operation;

determining, for an initial moment of a voice call, one of the at least two audio acquisition devices that corresponds to pre-configured information as the target audio acquisition device, and determining the voice call state at the initial moment; and making, for the current moment other than the initial moment of the voice call, a voice call with a peer-end device based on a voice signal acquired by the target audio acquisition device.

* * * * *